United States Patent
Lanard et al.

(10) Patent No.: US 10,011,306 B2
(45) Date of Patent: Jul. 3, 2018

(54) MOTOR VEHICLE FAçADE MODULE

(71) Applicants: Valeo Systemes Thermiques, Le Mesnil-Saint-Denis (FR); Valeo Japan Co., Ltd., Saitama (JP)

(72) Inventors: Jean-Louis Lanard, Feucherolles (FR); Issmail Meskin, Le Mesnil-Saint-Denis (FR); Julien Dallery, Tokyo (JP); Jean-Nicolas Guyomard, Le Mesnil Fuguet (FR)

(73) Assignees: Valeo Systemes Thermiques, Le Mesnil Saint Denis (FR); Valeo Japan Co., Ltd., Saitama (JP)

(*) Notice: Subject to any disclaimer, the term of this patent is extended or adjusted under 35 U.S.C. 154(b) by 0 days.

(21) Appl. No.: 15/105,730

(22) PCT Filed: Dec. 17, 2014

(86) PCT No.: PCT/EP2014/078318
§ 371 (c)(1),
(2) Date: Jun. 17, 2016

(87) PCT Pub. No.: WO2015/091699
PCT Pub. Date: Jun. 25, 2015

(65) Prior Publication Data
US 2016/0311472 A1   Oct. 27, 2016

(30) Foreign Application Priority Data
Dec. 18, 2013 (FR) ..................... 13 62909

(51) Int. Cl.
*B62D 25/08* (2006.01)
*B62D 27/06* (2006.01)
*B62D 29/00* (2006.01)

(52) U.S. Cl.
CPC ......... *B62D 25/085* (2013.01); *B62D 25/084* (2013.01); *B62D 27/065* (2013.01); *B62D 29/004* (2013.01); *B62D 29/005* (2013.01)

(58) Field of Classification Search
CPC .... B60K 11/04; B62D 25/084; B62D 25/085; B62D 29/004; B62D 29/005
(Continued)

(56) References Cited

U.S. PATENT DOCUMENTS

| 7,735,226 B2 * | 6/2010 | Riviere | B29C 45/1418 29/897.2 |
| 8,167,361 B2 * | 5/2012 | Riviere | B60R 19/12 296/187.09 |
| 2013/0320707 A1 * | 12/2013 | Steinke | B62D 25/08 296/187.01 |

FOREIGN PATENT DOCUMENTS

| DE | 10 2009 042175 A1 | 3/2011 |
| EP | 2028082 * | 2/2009 |

(Continued)

OTHER PUBLICATIONS

International Search Report issued in PCT/EP2014/078318 dated Mar. 6, 2015 (3 pages).
(Continued)

*Primary Examiner* — Dennis H Pedder
(74) *Attorney, Agent, or Firm* — Osha Liang LLP

(57) ABSTRACT

The present invention relates to a motor vehicle facade module (1) comprising a support piece (3, 5, 7, 9) comprising: —a first part (11) comprising an upper crossmember (3) having a first reinforcement (10), —a second part (13) made of plastic and comprising: lateral uprights (7), and at least two portions (15) configured for assembly with the first part (11), the at least one portion (15) comprising a second reinforcement (12).

12 Claims, 1 Drawing Sheet

(58) Field of Classification Search
USPC .................. 296/193.09, 193.1; 180/68.4
See application file for complete search history.

(56) References Cited

FOREIGN PATENT DOCUMENTS

| EP | 2 669 149 A2 | 12/2013 |
|----|--------------|---------|
| FR | 2 841 863 A1 | 1/2004 |
| FR | 2874889 * | 3/2006 |
| WO | 03/051704 A1 | 6/2003 |

OTHER PUBLICATIONS

Written Opinion of the International Searching Authority issued in PCT/EP2014/078318 dated Mar. 6, 2015 (5 pages).

* cited by examiner

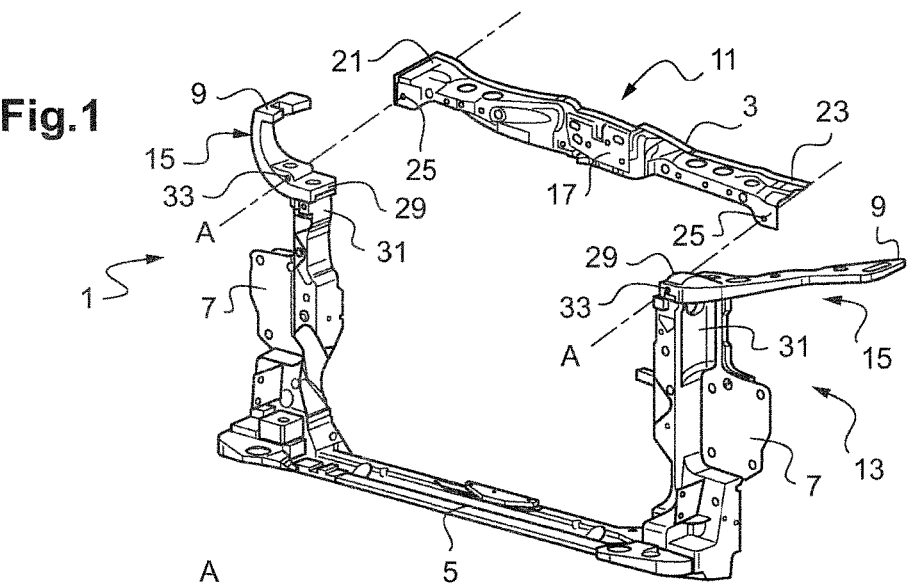
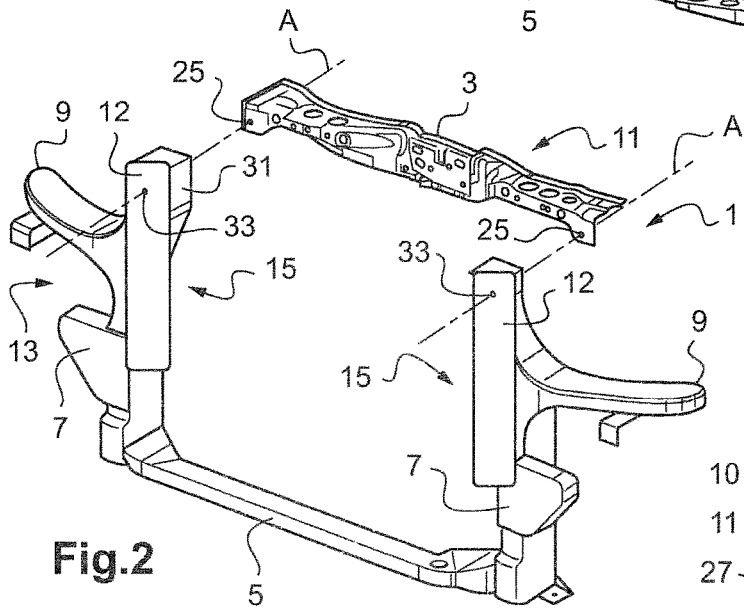
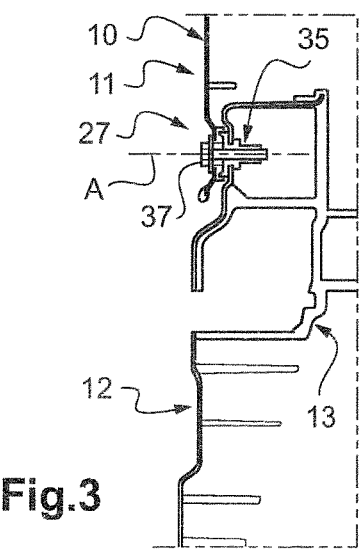

MOTOR VEHICLE FAçADE MODULE

The present invention relates to a motor vehicle facade module, and more specifically to a motor vehicle facade module composed of a plurality of distinct parts.

A facade module is a structural element which can incorporate various items of equipment of the vehicle, such as headlights, indicators, audible warning device, heat exchanger, cooling module, hood closure lock, and the like.

The facade module, thus provided with its equipment, constitutes a unitary module which is prepared and supplied by the parts manufacturer to the motor vehicle manufacturer, in order to be fitted on the vehicle. The facade module is fitted on the vehicle by connection to the elements of the chassis of the vehicle, such as side-members, wings or body shells, then putting into place of a front fender or shield added onto the module.

A facade module generally comprises a support part for one or a plurality of radiators or cooling modules, for the front headlights and a fender beam which participates in the protection of the equipment of the module in the event of frontal impact. These components are secured to one another rigidly in order to maintain the geometry and cohesion of the assembly. In order to comply better with constraints of maintenance of the radiators or cooling modules, it is known to have a support part made of a plurality of distinct parts. For example, it is known to have a support part comprising a first part comprising the upper cross-member, secured between, or at the top of, the lateral uprights, and a second part comprising a lower cross-member with lateral uprights. The possibility of separating the upper cross-member from the lateral uprights makes it possible to proceed with maintenance of the vehicle radiators, without needing to dismantle the cooling modules.

It is also known to form the different parts of the support part in different materials. For example, a first part can be formed from reinforced material, such as a hybrid material, and a second part can be formed from plastic material. The hybrid material technology which combines metal and plastic material reinforces the mechanical strength of the plastic.

In general, it is the most voluminous part which is formed from plastic material, such as to lighten the structure of the module as much as possible. In general, this voluminous part is the second part which comprises the lower cross-member with the lateral uprights and lateral projections, the first part comprising the upper cross-member made of hybrid material. This particular design which combines different materials makes it possible both to comply with the constraints of lightness and low cost price, thanks to the elements made of plastic material, and also with the constraints of mechanical strength in the case of impact, thanks to the elements made of hybrid material. In fact, a facade module formed entirely from plastic material does not make it possible to comply with the safety requirements of the crash tests.

However, in the case of a support part comprising a plurality of parts made of different materials, it is necessary to secure the parts to one another by means of fastening means. The resistance to the crash test provided by this type of design may be insufficient. During an impact, the different parts can be subjected to mechanical stresses which can give rise to breakage of the fastenings between the first and the second part, thus giving rise to opening of the hood of the vehicle.

The objective of the invention is to propose a motor vehicle facade module composed of a plurality of distinct parts, making it possible to eliminate one or more disadvantages of the prior art.

For this purpose, the subject of the invention is a motor vehicle facade module comprising a support part comprising:
  a first part comprising an upper cross-member with a first reinforcement;
  a second part made of plastic material comprising lateral uprights, and at least two portions configured for the assembly with the first part,
the at least one portion comprising a second reinforcement.

Thus, the assembly of the first part of the facade module with the second part forms a strong connection, making it possible to guarantee the resistance of the fastenings during an impact of the vehicle.

Said facade module can additionally comprise one or a plurality of the following characteristics, taken separately or in combination:
  The at least two portions each comprise a second reinforcement.
  The second reinforcement is over-molded, thus improving the rigidity and mechanical strength of the plastic material of the portions.
  The upper cross-member comprises at each of its lateral ends a through orifice which passes through at least the first reinforcement, and the at least one portion comprising a second reinforcement comprises an orifice which passes through said second reinforcement, which is configured to cooperate with the orifice in the upper cross-member in order to receive a fastening means making it possible to assemble these two parts, thus forming a strong connection.
  The securing means is fitted according to a securing axis A perpendicular to the lateral uprights, such that its head is oriented towards the front of the vehicle.
  The securing means is an insert with a screw, thus contributing towards forming the strong connection between the assembled parts.
  The portions of the second part with the second reinforcement form lateral projections, and in this case the strong connection is formed between the upper cross-member and the lateral projections.
  The orifice is provided in the end of the lateral projections which is adjacent to the upper end of the lateral uprights.
  The two lateral uprights incorporate the portions of the second part comprising the second reinforcement, and in this case the strong connection is formed between the upper cross-member and the lateral uprights.
  The second reinforcement has a length which is shorter than, or equal to, the length of the lateral uprights, and its length is optimized such that the second reinforcement extends from one fastening to another fastening.
  The orifice is provided in the upper end of the lateral uprights.
  The second reinforcement is a material selected from among materials with high resilient resistance, made of drawn steel, or drawn aluminum, or of a composite sheet, thus providing the reinforcement with resistance to substantial stresses.
  The second part comprising the two lateral uprights, which are connected to one another by the lower cross-member and the lateral projections, is made in a single piece, which makes it possible to limit the number of fastenings necessary in order to constitute the support part.

Other characteristics and advantages of the invention will become more apparent from reading the following description, provided by way of non-limiting illustration, and from the appended drawings in which:

FIG. 1 is a front view in perspective of the facade module according to a first embodiment;

FIG. 2 is a front view in perspective of the facade module according to a second embodiment.

FIG. 3 is a schematic view in lateral cross-section of the upper cross-member assembly with the lateral uprights according to the second embodiment.

In these figures, elements which are identical have the same references.

In the description, the terms "upper" and "lower" are defined relative to the vertical direction oriented according to the height of an assembled vehicle.

In the embodiment represented in FIG. 1, the facade module 1 comprises a support part 3, 5, 7, 9 which is represented in a simplified manner, since it is without various elements such as radiators, cooling modules and other elements which are secured on it when the vehicle is assembled. The support part 3, 5, 7, 9 comprises two distinct parts, i.e. a first part 11 which comprises the upper cross-member 3, and a second part 13 made of plastic material comprising lateral uprights 7. The two lateral uprights 7 are vertical and substantially parallel to one another. They can be connected to one another by a lower cross-member 5 at their lower end. The lower cross-member 5 is itself substantially parallel to the upper cross-member 3. The two lateral uprights 7 can also comprise lateral projections 9. Said lateral projections 9 can be used in particular to secure the facade module 1 on a structural element of the vehicle. The lateral projections 9 can support at least partly the headlights (not represented).

The facade module 1 can also be secured on the chassis of the vehicle by the lateral uprights 7 themselves.

The upper cross-member 3 has a first reinforcement 10 (which can be seen in FIG. 3). The first reinforcement 10 is over-molded by a plastic material according to a so-called hybrid structure. Hybrid structure means a material comprising two distinct materials, such as, for example, a metal which is over-molded by plastic material. The metal can be for example steel, or aluminum. This hybrid structure makes it possible to improve the strength and mechanical resistance of the plastic material.

The first reinforcement 10 can also be a composite sheet. Said sheets are previously formed by thermoforming then over-molded by a plastic material.

The upper cross-member 3 comprises a central receptacle which can receive a support (not represented) for locking the hood of the motor vehicle.

At each of its lateral ends 21, 23, the upper cross-member 3 also comprises an orifice 25 which passes through at least the first reinforcement. The opening of the orifice 25 faces towards the front of the vehicle, and is configured to receive a fastening means 27 (shown in FIG. 3) which makes it possible to assemble the upper cross-member 3 with the second part 13 of the support part 3, 5, 7, 9 according to a securing axis A which is perpendicular to the lateral uprights 7.

The second part 13 comprising the two lateral uprights 7, which are connected to one another by the lower cross-member 5 and the lateral projections 9, can in particular be formed in a single piece. This embodiment in a single piece makes it possible to limit the number of fastenings necessary in order to constitute the support part 3, 5, 7, 9. The lateral uprights 7 and the lower cross-member 5 have a general form of a "U" when seen from the front. The lateral projections 9 can be assimilated to arms which extend substantially horizontally and laterally.

The second part 13 comprises at least two portions 15 which are configured for assembly with the first part 11.

At least one portion 15 comprises a second reinforcement 12.

The two portions 15 can also each comprise a second reinforcement 12 (shown in FIG. 3). In the embodiment shown in FIG. 1, the portions 15 with the second reinforcement 12 form the lateral projections 9. The second reinforcement 12 is over-molded by plastic in order to form the portions 15, according to a so-called hybrid structure, as previously described with reference to the first part 11. Like the first reinforcement 10, the second reinforcement 12 can be made of metal. The metal material from which the second reinforcement 12 is formed can for example be selected from among materials with high resilient resistance, for example drawn steel or drawn aluminum, thus providing the second reinforcement 12 with resistance to substantial stresses, of approximately 500/600 MegaPascals (MPa). The second reinforcement 12 can also be formed from a composite material such as a composite sheet.

The second reinforcement 12 thus improves the rigidity and the mechanical resistance of the plastic material of the portions 15. The lateral uprights 7 and the lower cross-member 5 are for their part made only of plastic material.

The at least one portion 15 comprising a second reinforcement 12 also comprises an orifice 33 which passes through said second reinforcement 12, configured to cooperate with the orifice 25 in the upper cross-member 3, in order to receive a fastening means 27 (shown in FIG. 3) which makes it possible to assemble these two parts 1, 5, 3. The orifice 33 is provided in the end 29 of the lateral projections 9 which is adjacent to the upper end 31 of the lateral uprights 7.

It will thus be understood that the assembly formed between the two portions 15 and the upper cross-member 3 is formed between two parts comprising a reinforcement. Thus, the assembly of the first part 11 of the facade module 1 with the second part 13 forms a strong connection. This strong connection makes it possible to guarantee the resistance of the fastenings during an impact of the vehicle, thus preventing the hood of the vehicle from being lifted.

A description will now be provided of a second embodiment of the invention which is represented in FIG. 2.

In this embodiment, the facade module 1 also comprises two distinct parts, i.e. a first part 11 comprising the upper cross-member 3, comprising a first reinforcement 10, and a second part 13, made in a single piece of plastic material, comprising the two lateral uprights 7, the lower cross-member 5 and the lateral projections 9.

In this embodiment, the two lateral uprights 7 incorporate the portions 15 of the second part 13 each comprising a second reinforcement 12.

The lateral projections 9 and the lower cross-member 5 are for their part made only of plastic material.

In this embodiment, the assembly of the upper cross-member 3 with the second part 13 is formed at the lateral uprights 7, such as to obtain a strong connection. The lateral uprights 7 thus each comprise at their upper end 31 an orifice 33, the opening of which faces towards the front of the vehicle.

The second reinforcement 12 on which a plastic material is over-molded can in particular be apparent on the face of the lateral uprights 7 which faces the front side of the vehicle, and is over-molded at its ends by the plastic material which forms the second part 13, as illustrated in FIG. 3. This second reinforcement 12 makes it possible to provide the plastic material with mechanical resistance only in the areas which are subjected to the stress during an impact of the vehicle.

The second reinforcement 12 has dimensions similar to those of the lateral uprights 7 on which it is over-molded. Its thickness is limited to the minimum extent necessary, for example the thickness of the second reinforcement 12 is designed to provide the plastic material of the lateral uprights 7 with sufficient resistance to breakage during an impact. For example, the thickness of the reinforcements is between 0.8 and 2 mm. The presence of the second reinforcement 12 gives rise to a decrease in the forces sustained by the plastic material of the lateral uprights 7 during the impact.

The length of the second reinforcement 12 is shorter than, or equal to, the length of the lateral uprights 7. Since the role of the second upright 12 is to guarantee a strong connection between the assembled parts, its length can be optimized such that it extends only from one fastening to another fastening. Also, as can be seen in FIG. 2, the length of the second reinforcement 12 does not extend along the entire length of the lateral uprights 7. In fact, the length of the second reinforcement 12 extends from the fastening of the lateral uprights 7 with the upper cross-member 3, to the fastening of the lateral uprights 7 with the chassis of the vehicle. This limitation makes it possible to optimize the weight of the second part 13 relative to the mechanical resistance expected from this part.

As can be seen in FIG. 3, the fastening means 27 used for the assembly is for example an insert 35 with a screw or a bolt, or any other equivalent securing means known to persons skilled in the art, made of metal material. The fastening means 27 is fitted horizontally according to the securing axis A, such that its head 37 is oriented towards the front of the vehicle. Thus, during a frontal impact of the vehicle, the forces which are exerted on the fastening means 27 are oriented in the same direction as the clamping stresses, therefore contributing to keeping the fastening means 27 configured to assemble the first part 11 with the second part 13 of the support part 3, 5, 7, 9.

It will thus be understood that since the assembly of the first and second parts of the support part of a motor vehicle facade module is formed between two portions comprising a reinforcement, this forms a strong connection, thus guaranteeing the resistance of the fastenings during an impact of the vehicle.

The invention claimed is:

1. A motor vehicle facade module comprising a support part comprising:
   a first part comprising an upper cross-member with a first reinforcement; and
   a second part made of plastic material comprising:
      two lateral uprights;
      two portions configured for assembly with the first part, each of the two portions comprising: a second reinforcement; and a lateral projection, such that there are two second reinforcements and two lateral projections,
      wherein the upper cross-member of the first part comprises at least one first orifice that passes through the first reinforcement,
      wherein each of the two portions comprises at least one second orifice that passes through the second reinforcement, the at least one second orifice being configured to cooperate with the at least one first orifice via a first fastening means, and
      wherein a length of each of the two second reinforcements extends from the first fastening means to a second fastening means of the lateral uprights with a chassis of the motor vehicle.

2. The motor vehicle facade module as claimed in claim 1, wherein the second reinforcement is over-molded.

3. The motor vehicle facade module as claimed in claim 1, wherein the fastening means is fitted according to a securing axis (A) perpendicular to the lateral uprights.

4. The motor vehicle facade module as claimed in claim 1, wherein the fastening means is an insert with a screw.

5. The motor vehicle facade module as claimed in claim 1, wherein the at least one second orifice of each of the two portions is provided at an end of the two lateral projections, the end of the two lateral projections being adjacent to an upper end of the two lateral uprights.

6. The motor vehicle facade module as claimed in claim 1, wherein the two lateral uprights incorporate the portions of the second part comprising the second reinforcement.

7. The motor vehicle facade module as claimed in claim 6, wherein the second reinforcement has a length which is shorter than, or equal to, the length of the lateral uprights.

8. The motor vehicle facade module as claimed in claim 6, wherein the at least one second orifice is provided in the upper end of the lateral uprights.

9. The motor vehicle facade module as claimed in claim 1, wherein the second reinforcement is formed from a material selected from among materials with high resilient resistance, made of drawn steel, or drawn aluminum, or of a composite sheet.

10. The motor vehicle facade module as claimed in claim 1,
   wherein the two lateral uprights of the second part, which are connected to one another by a lower cross-member and the two lateral projections, are made in a single piece.

11. A motor vehicle facade module comprising a support part comprising:
   a first part comprising an upper cross-member with a first reinforcement; and
   a second part made of plastic material comprising:
      two lateral uprights; and
      two portions configured for the assembly with the first part, wherein at least one of the two portions comprises a second reinforcement,
      wherein a length of the second reinforcement extends from a first fastening of the lateral uprights with the upper cross-member to a second fastening of the lateral uprights with a chassis of the motor vehicle.

12. A motor vehicle facade module comprising a support part comprising:
   a first part comprising an upper cross-member having a first reinforcement; and
   a second part comprising:
      two lateral uprights each having a lower end,
         wherein the two lateral uprights are connected to each other at their lower ends by a lower cross-member, and
         wherein the two lateral uprights and the lower cross-member are made only of plastic material; and
      two portions configured for assembly with the first part, wherein each of the two portions comprises a second reinforcement,
      wherein a length of the second reinforcement extends from a first fastening of the lateral uprights with the upper cross-member to a second fastening of the lateral uprights with a chassis of the motor vehicle.

\* \* \* \* \*